March 29, 1955 S. K. WEISSBERG 2,704,938
GYRO PRECESSING SYSTEM
Filed Nov. 19, 1953
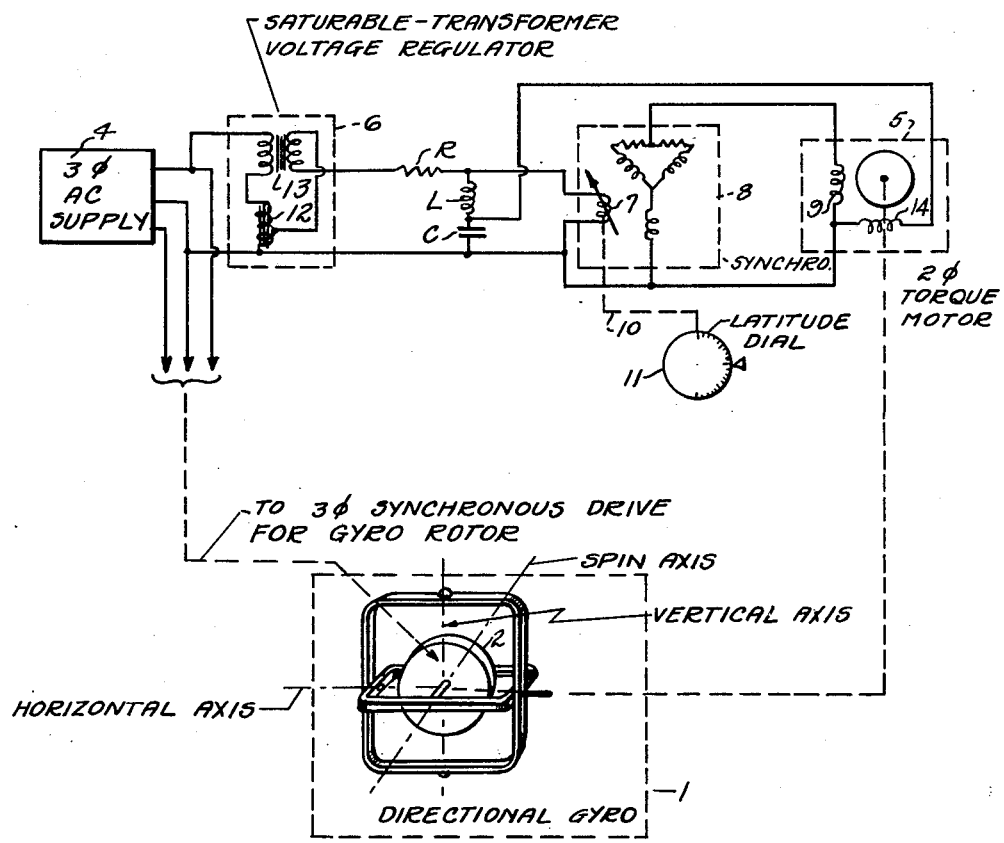
INVENTOR.
STANLEY K. WEISSBERG
BY Wade Koontz
ATTORNEY
James L. Shannon AND
AGENT.

United States Patent Office

2,704,938
Patented Mar. 29, 1955

2,704,938

GYRO PRECESSING SYSTEM

Stanley K. Weissberg, Riveredge, N. J., assignor to the United States of America as represented by the Secretary of the Air Force Application November 19, 1953, Serial No. 393,250

5 Claims. (Cl. 74—5.4)

This invention relates to systems for imposing a precessive force on a gyro and particularly to a system for imposing a precessive force about the horizontal or leveling axis of a directional gyro for the purpose of compensating for the apparent drift of the gyro due to the earth's rotation. This apparent drift is proportional to the sine of the latitude angle.

In accordance with the invention the latitude correction is introduced by the rotation of the rotor of a synchro the output of which is fed directly to the variable phase of a two-phase torque motor attached to the gyro cage. Since the synchro output varies sinusoidally with the position of the rotor, and since the precessing torque required for latitude correction varies as the sine of the latitude angle, the rotation of the rotor can be calibrated along a linear 180° dial. Any other device having an output voltage proportional to the sine of an input angle may be used in place of the synchro.

The precessive force necessary to produce the required latitude correction is determined by the angular momentum of the gyro rotor. If the rotor is driven by a synchronous motor the speed of the rotor varies linearly with changes in frequency of the power source but is independent of its voltage. On the other hand, the turning moment produced by the torque motor, which is energized from the same power source, is dependent upon the voltage applied to it. Therefore, in order to achieve accurate latitude correction in the presence of changes in voltage and frequency of the power source it is necessary that the torque produced by the two-phase motor change linearly with frequency but be independent of the applied voltage over the normal range of voltage fluctuation. In accordance with the invention, a voltage for the torque motor that is substantially independent of voltage fluctuations of the power source is obtained by the use of a voltage regulator of the saturable-transformer type which has its frequency-voltage characteristic modified to that required to produce a linear relation between power source frequency and torque of the two-phase motor over the normal range of frequency fluctuation.

A more detailed explanation of the invention will be made in connection with the accompanying drawing which shows schematically an embodiment of the invention.

Referring to the drawing a directional gyro 1 has its rotor 2 driven by a synchronous motor, usually an integral part of the rotor, which is energized from power source 4. In order to correct the apparent drift of the gyro due to the earth's rotation, a turning moment is applied to the gyro about its horizontal axis. This moment is exerted by two-phase torque motor 5, likewise energized from source 4, and causes a precession of the gyro about its vertical axis. The turning force must be proportional to the sine of the latitude angle and also must be proportional to the frequency of the power source since the speed, and therefore the angular momentum, of rotor 2 is also proportional to the frequency of the power source. Further, since the speed of rotor 2 is unaffected by changes in the voltage of source 4 the torque produced by motor 5 must likewise be unaffected by such changes.

The circuit for obtaining the correct precessive torque from motor 5 is shown schematically in the drawing. Voltage from power source 4 is applied to voltage regulator 6 the output of which is applied to rotor winding 7 of synchro 8. The three stator windings of the synchro are connected for single output circuit operation, as shown, and the output voltage therefrom is applied to variable phase winding 9 of motor 5. This output voltage is proportional to the sine of the angle through which coil 7 has been rotated from its zero position. Shaft 10 of the synchro carries a dial 11 which may be graduated from the maximum positive to the maximum negative latitude angle on a linear scale. In this way the torque of motor 5, for a given power source frequency, is made proportional to the sine of the angle indicated on dial 11. While a synchro is a convenient device for obtaining the above sine relationship, any other device having an output voltage proportional to the sine of an input angle may be used.

Voltage regulator 6 is of the saturable-transformer type comprising saturable reactor 12 and bucking transformer 13. This is a known type of regulator the operating principles of which are described in the literature, for example, in vol. 17 of the Radiation Laboratory Series, Components Handbook — Blackburn, McGraw-Hill, pages 455–460. If there is no change in frequency the output voltage of the regulator remains substantially constant over the normal range of voltage fluctuation of source 4 and torque of motor 5 is therefore unaffected by these voltage fluctuations. Changes in frequency, however, are accompanied by a change in output voltage in the same direction, and this characteristic of the regulator is utilized to produce the required relationship between the torque of motor 5 and the frequency of source 4.

Since the frequency-output voltage characteristic of the regulator may not have the form needed to produce the desired frequency-torque characteristic of motor 5 a corrective network consisting of elements R, L and C may be used to obtain the required characteristic. The resonant frequency of the L-C series combination should fall either below the lowest frequency of source 4 or above the highest frequency depending upon the degree and type of correction required. For a particular voltage regulator the resonant frequency and the value of R should be so selected that the frequency-torque characteristic of motor 5 matches the frequency-speed characteristic of gyro rotor 2, which is a linear characteristic.

The L-C network serves the additional purpose of introducing the required 90° phase shift in the voltage applied to fixed phase winding 14 of motor 5. Since the resonant frequency remains unchanged as long as the product LC remains constant, the values of L and C may be varied inversely to achieve the proper phase shift without disturbing the resonant frequency.

I claim:

1. A gyro having a rotor driven at a speed proportional to the frequency of an alternating current power source, a torque motor energized from said power source for applying a precessive force to said gyro, and a network located between said power source and said motor, said network having an output voltage substantially independent of input voltage over the range of fluctuation of the voltage of said power source and an output voltage-frequency characteristic so related to the voltage-torque characteristic of said motor as to produce a linear relationship between torque and frequency in said motor over the range of frequency fluctuation of said power source.

2. A directional gyro having a rotor driven at a speed proportional to the frequency of an alternating current power source, a torque motor energized from said power source for applying a precessive force to said gyro about its horizontal axis, a network located between said power source and said motor, said network having an output voltage substantially independent of input voltage over the range of fluctuation of the voltage of said power source and an output voltage-frequency characteristic so related to the voltage-torque characteristic of said motor as to produce a linear relationship between torque and frequency in said motor over the range of frequency fluctuation of said power source, and voltage amplitude control means located between said power source and said motor and in cascade with said network for producing a torque in said motor proportional to the sine of the latitude angle.

3. A gyro having a rotor electrically driven from an alternating current power source at a speed proportional to the frequency of said power source, a torque producing device energized from said power source and having a torque directly and linearly related to the frequency of said power source over the range of frequency fluctuation of said power source, and means for applying said torque as a precessive force to said gyro.

4. Apparatus as claimed in claim 3 in which additional means are provided for producing proportionality between said torque and the sine of the latitude angle.

5. A gyro having a rotor driven from an alternating current power source by a synchronous motor whereby the speed of said rotor is independent of power source voltage and proportional to power source frequency, a torque motor of the induction type mechanically coupled to said gyro for applying a precessive force thereto, and means for energizing said torque motor from said power source comprising means for applying a voltage to said torque motor that is independent of power source voltage and proportional to power source frequency.

References Cited in the file of this patent

UNITED STATES PATENTS

| | | |
|---|---|---|
| 2,293,039 | Esval | Aug. 18, 1942 |
| 2,486,935 | Fanta, Jr. | Nov. 1, 1949 |
| 2,588,607 | Barkalow | Mar. 11, 1952 |
| 2,603,094 | Wrigley | July 15, 1952 |